United States Patent [19]
Hsh

[11] Patent Number: 5,280,993
[45] Date of Patent: Jan. 25, 1994

[54] INFLATABLE CUSHIONING SADDLE FOR BICYCLE

[76] Inventor: Ah-Yeh Hsh, No. 22, Lane 245, San Min Rd., Sec. 2, Pu Chien, Pan Chiao City, Taipei Hsien, Taiwan

[21] Appl. No.: 868,219

[22] Filed: Apr. 14, 1992

[51] Int. Cl.⁵ .............................. B62J 1/00; B62J 1/26
[52] U.S. Cl. .............................. 297/199; 297/DIG. 3
[58] Field of Search ..................... 297/199, 200, 284.6, 297/DIG. 3; 5/454

[56] References Cited

U.S. PATENT DOCUMENTS

| | | | |
|---|---|---|---|
| 795,108 | 7/1905 | Doellinger | 5/644 |
| 5,074,618 | 12/1991 | Ballard | 297/199 |

FOREIGN PATENT DOCUMENTS

| | | | |
|---|---|---|---|
| 3436332 | 4/1986 | Fed. Rep. of Germany | 297/199 |
| 977164 | 3/1951 | France | 297/199 |
| 361887 | 11/1931 | United Kingdom | 5/454 |
| 2140294 | 11/1984 | United Kingdom | 5/454 |

*Primary Examiner*—Alexander Grosz
*Attorney, Agent, or Firm*—Bacon & Thomas

[57] ABSTRACT

An adjustable and deformation-resistant cushioning saddle for a bicycle is provided. The saddle includes a saddle frame having an envelope to form a space for receiving a cushioning medium. A fluid bag in the space serves as the cushioning medium and a fluid feeding device communicating with the fluid bag feeds fluid into the bag.

3 Claims, 6 Drawing Sheets

INFLATABLE CUSHIONING SADDLE FOR BICYCLE

BACKGROUND OF THE INVENTION

The present invention relates to a bicycle, and more particularly to a cushioning saddle therefor.

The conventional bicycle saddle generally includes a saddle frame having attached thereon an envelope so as to form therebetween a space to accommodate an elastic material or a foamed material. The elastic or foamed material, however, is often subject to an elastic fatigue or a permanent deformation phenomenon in certain areas after a period of use, due to a particular riding posture of a rider. Such elastic fatigue or permanent deformation causes pain or other discomfort to the rider.

SUMMARY OF THE INVENTION

It is, therefore, an object of the present invention to provide a bicycle cushioning saddle having an adjustable softness.

It is further an object of the present invention to provide a cushioning saddle having a cushioning medium which is easily refreshable and/or replaceable.

According to the present invention, a cushioned saddle includes a saddle frame having an envelope attached thereto to form therebetween a space receiving therein a cushioning medium. A fluid bag is located in the space to serve as the cushioning medium. A fluid feeding device communicating with the fluid bag is used for feeding a fluid into the fluid bag.

The fluid feeding device can include a fluid feeding inlet communicating with the fluid bag. A check valve mounted in the feeding inlet, and a fluid feeding device connected to the feeding inlet for feeding therefrom a fluid into the fluid bag.

BRIEF DESCRIPTION OF THE DRAWINGS

The present invention may best be understood through the following description with reference to the accompanying drawings, in which.

DETAILED DESCRIPTION OF THE PREFERRED EMBODIMENT

Figure 1:
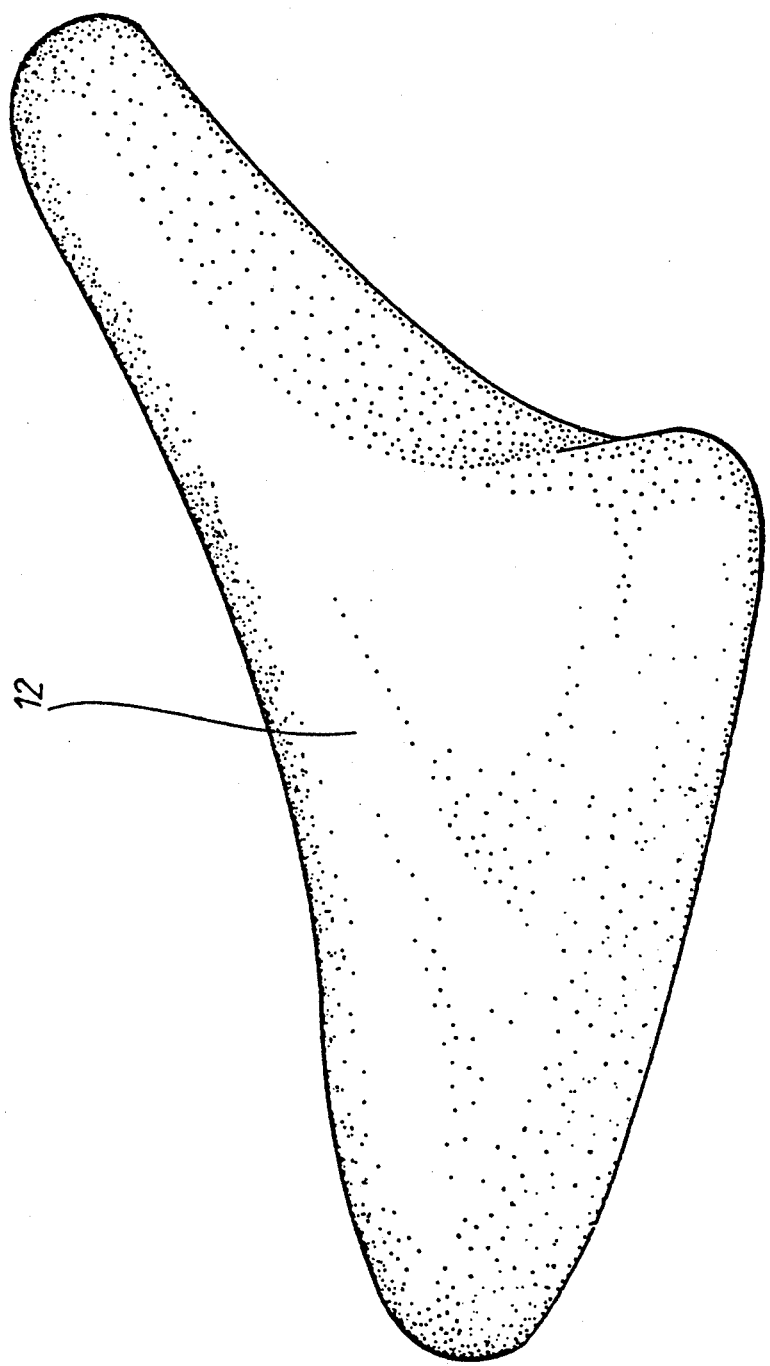
FIG. 1 is a perspective view showing a bicycle cushioning saddle according to the present invention.
Figure 2:
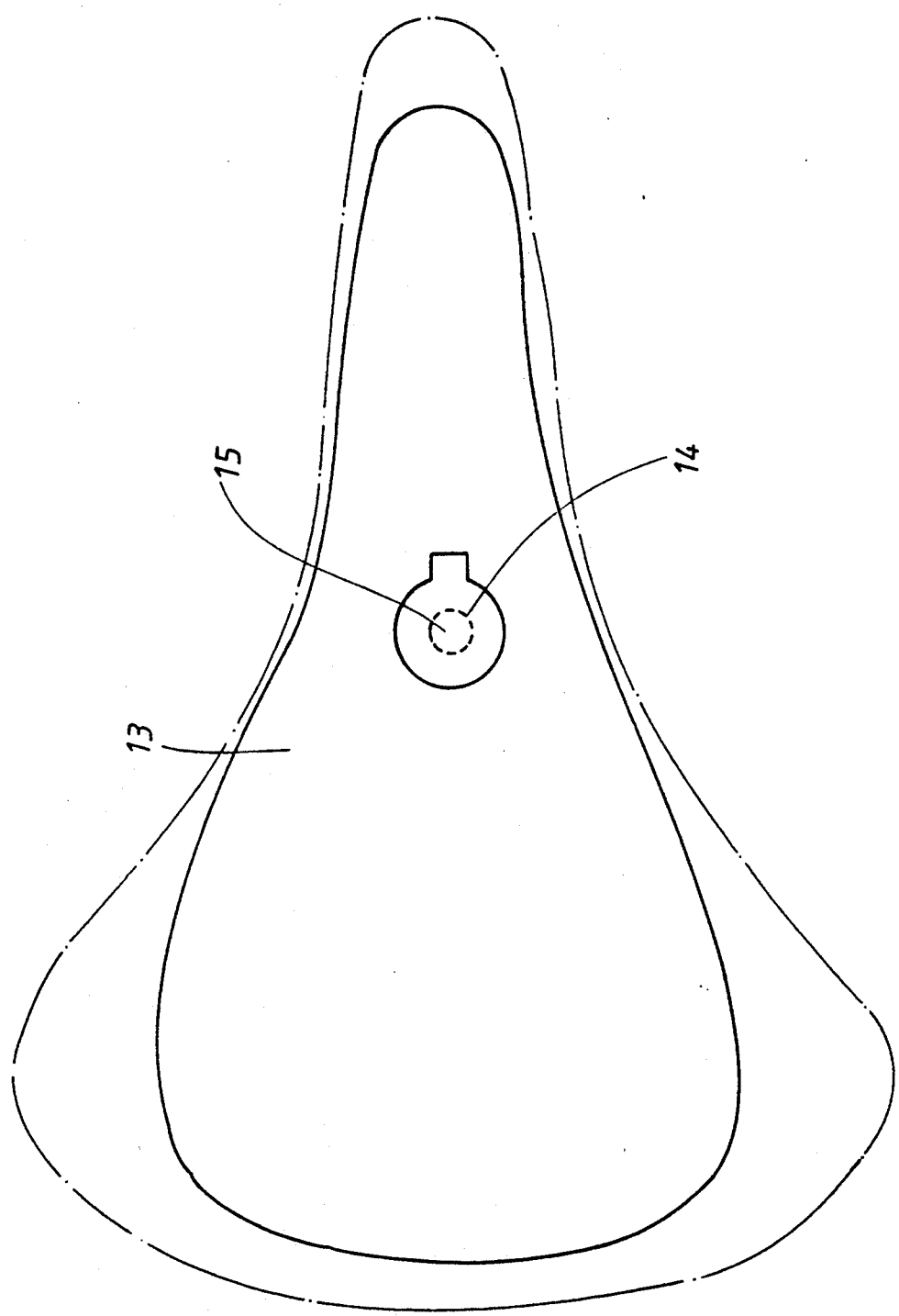
FIG. 2 is a schematic top view showing the cushioning saddle of FIG. 1.
Figure 3:
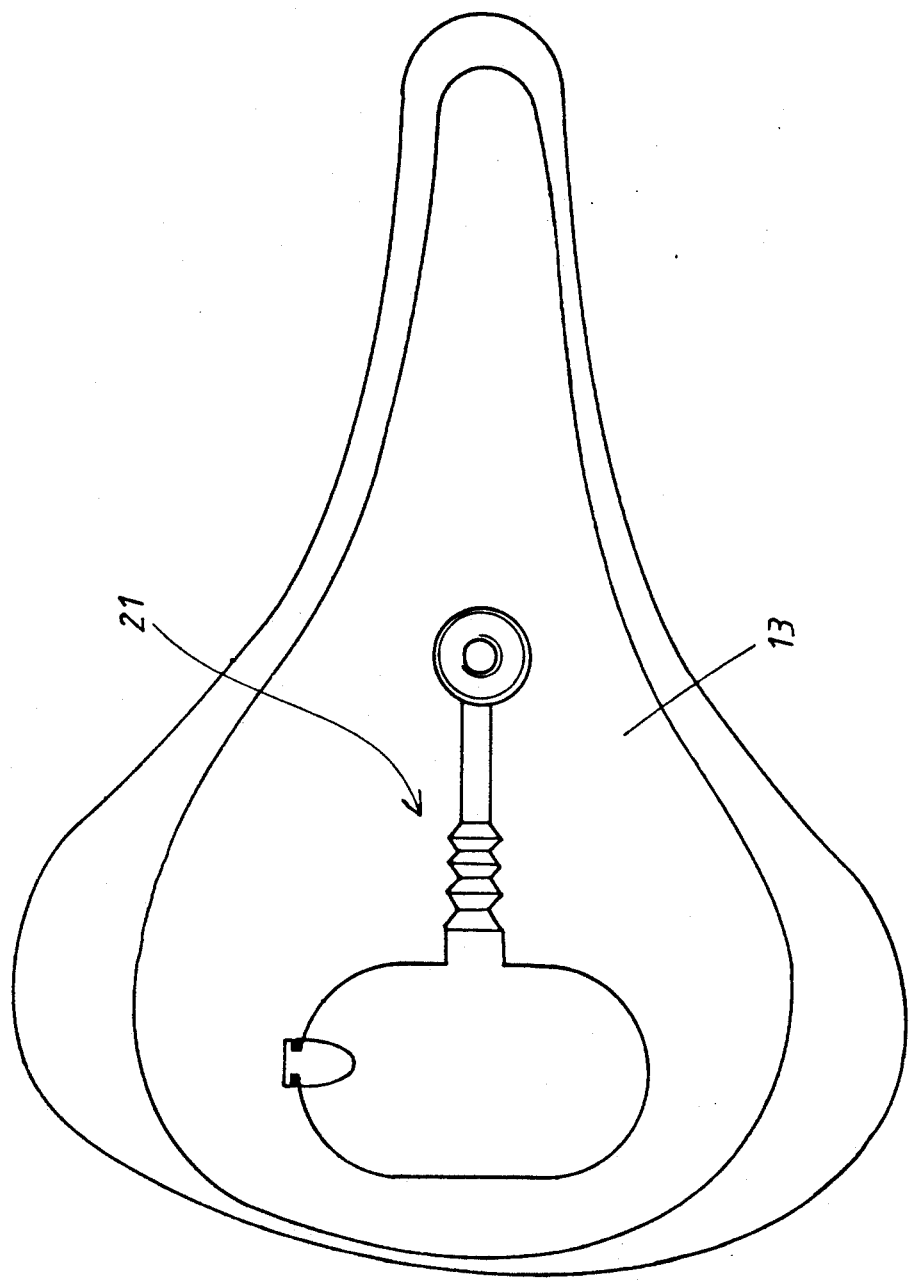
FIG. 3 is a schematic bottom view showing the cushioning saddle of FIG. 1.
Figure 4:
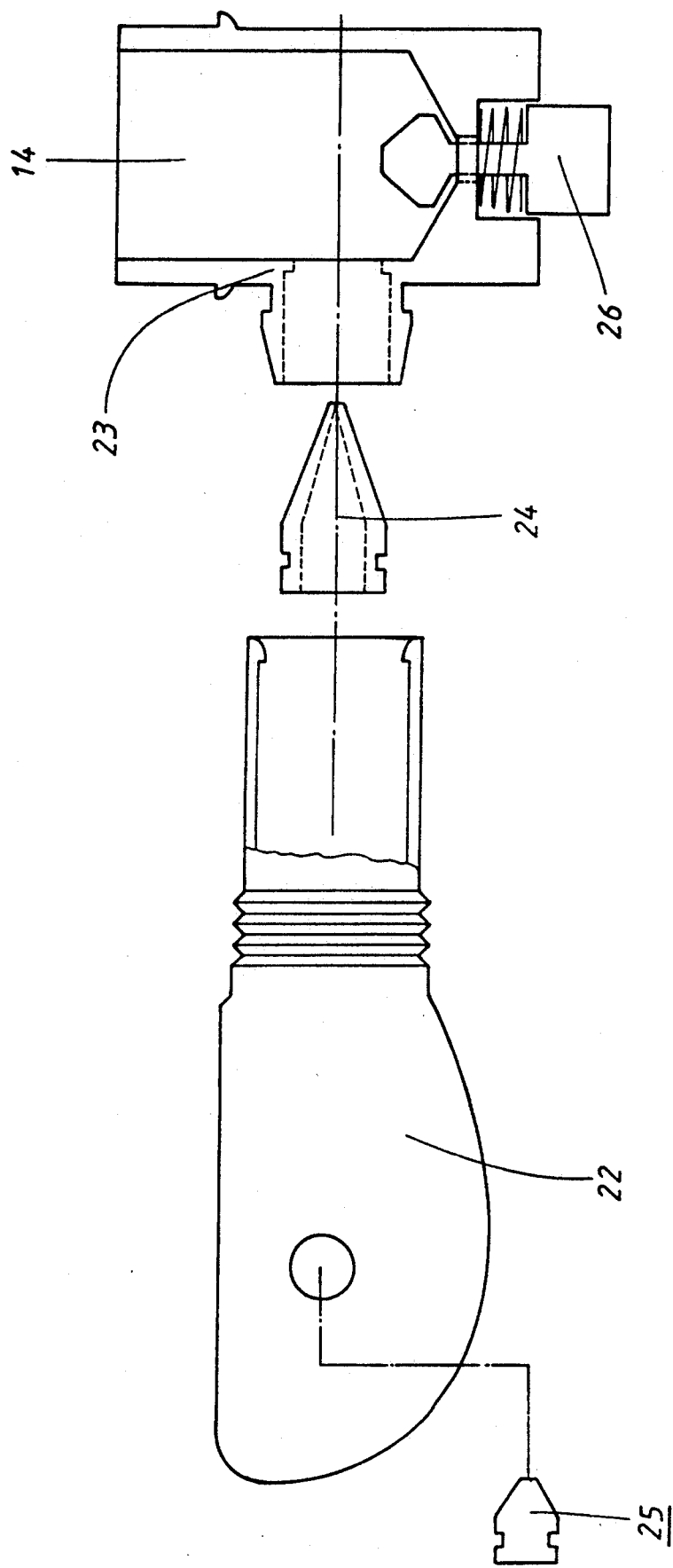
FIG. 4 is an exploded view showing a fluid feeding device for the cushioning saddle of FIG. 1.

Referring now to FIGS. 1-6, a bicycle cushioning saddle according to the present invention includes a saddle frame 1 1 adapted to be mounted on the seat pillar, a tough elastic envelope 12 attached to frame 1 1 to form therebetween a space, and a cushioning medium received in the space. The improvement resides in that a fluid tight bag 13 is provided in the space to serve as the cushioning medium. A fluid feeding device 21 communicates with fluid bag 13 for feeding into fluid bag 1 3 a fluid, e.g. air or water.

Figure 5:
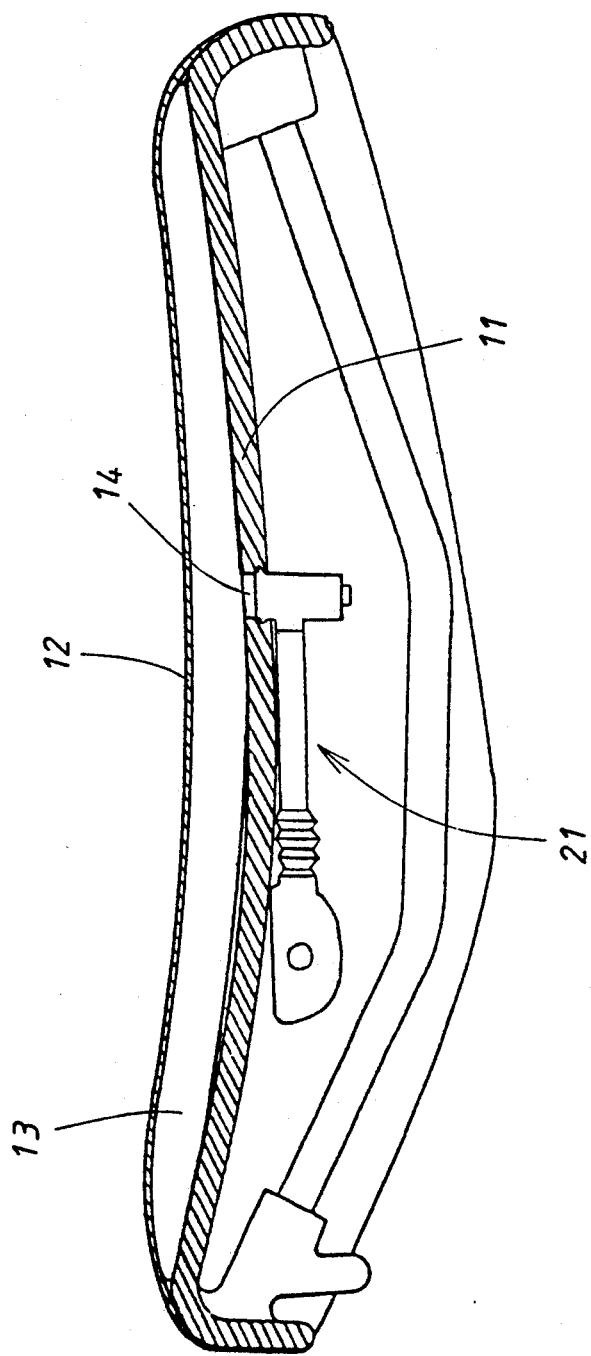
FIG. 5 is a cross-sectional view showing an air-fed cushioning saddle of FIG. 1.
Figure 6:
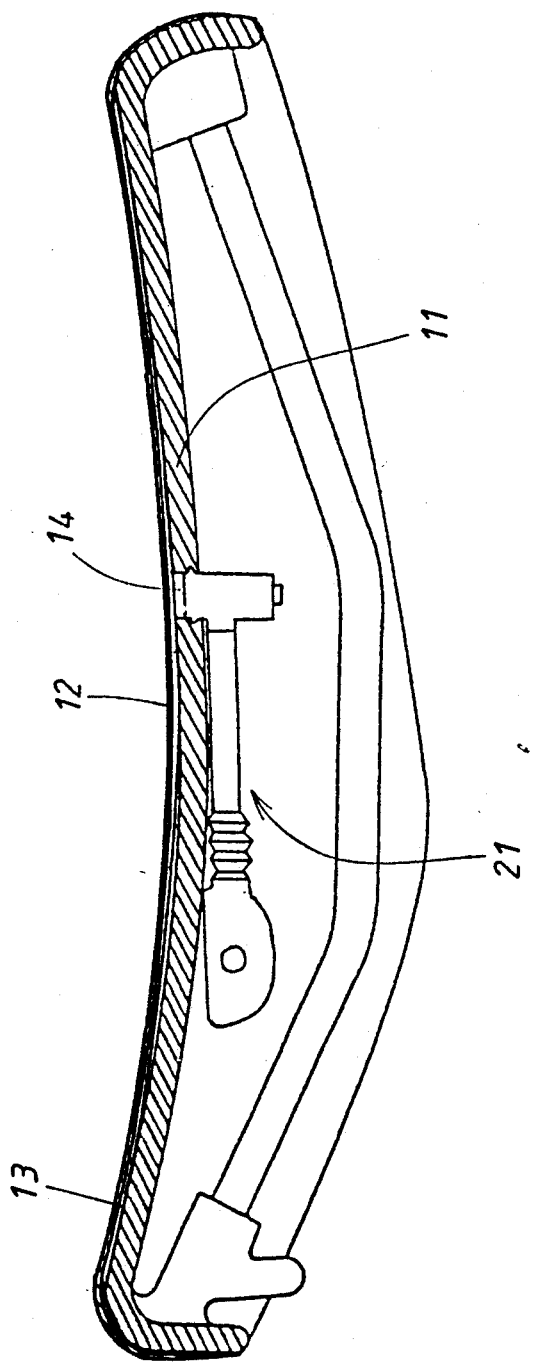
FIG. 6 is a cross-sectional view showing an air-fed cushioning saddle of FIG. 5 having the air therein released.

Bag 13 may be made of plastic and has an appearance in conformance with the outline of saddle frame 1 1. Bag 1 3 communicates with a feeding port 1 5 of a fluid feeding inlet member 14 of the fluid feeding device 21. Fluid feeding device 21 includes: a check valve seat 23 formed on fluid feeding inlet member 14; a check valve body 24 to be seated on seat 23; a releasing valve 26 mounted on fluid feeding inlet member 14; and an elastic hollow ball 22 provided with a check valve 25. To feed a fluid into fluid bag 13, one repeatedly compresses and releases ball 22. Bag 13 will be inflated to elevate envelope 12 as shown in FIG. 5. When one presses the releasing valve 26, the air in bag 13 is released to lower envelope 12 as shown in FIG. 6.

The softness of the present saddle depends upon the quantity of the air in bag 13 and thus is adjustable by the provisions of fluid feeding device 21 and releasing valve 26.

It should now become readily apparent how and why the present invention can achieve the objects it contemplates.

I claim:

1. An adjustable, cushioned bicycle saddle comprising:
    a) a saddle frame having an upper side, a lower side and adapted to be attached to a bicycle;
    b) an envelope attached to the saddle frame so as to define space between the upper side of the saddle frame and the envelope;
    c) a fluid tight bag located in the space between the saddle frame and the envelope;
    d) a fluid feeding inlet members mounted on the lower side of the saddle frame and communicating with the interior of the fluid tight bag, the fluid feeding inlet member defining a fluid inlet and a fluid releasing outlet;
    e) a fluid feeding device operatively connected to the fluid feeding inlet so as to supply fluid to the fluid tight bag via the fluid feeding inlet member, said fluid device being located adjacent the lower side of the saddle frame;
    f) a first check valve operatively associated with the fluid feeding inlet so as to allow fluid to flow into the fluid feeding inlet membered and to prevent fluid from flowing out of the fluid feeding inlet member; and,
    g) a second valve operatively associated with the fluid releasing outlet so as to be movable between a normal closed positioning which fluid flow out of the fluid feeding inlet member is prevented and an open position wherein fluid flow out of the fluid feeding inlet member is permitted so as to enable adjustment of the fluid in the fluid tight bag.

2. The cushioned bicycle saddle of claim 1 further comprising biasing means to bias the second valve toward its lobed position.

3. The cushioned bicycle saddle of claim 1 wherein the fluid feeding device comprises an elastic hollow ball.

* * * * *